United States Patent [19]
Tucker et al.

[11] 3,941,578
[45] Mar. 2, 1976

[54] ZINC OXIDE COATED UREA

[75] Inventors: Gerald L. Tucker; Elmer Ladelle Blanton, both of Yazoo City, Mich.

[73] Assignee: Mississippi Chemical Corporation, Yazoo City, Miss.

[22] Filed: Sept. 23, 1971

[21] Appl. No.: 183,018

[52] U.S. Cl. ................. 71/28; 71/64 F; 71/64 G; 71/64 DB; 260/555 C
[51] Int. Cl.² ................. C05C 9/00; C07C 126/00
[58] Field of Search .......... 71/1, 28, 30, 64 E, 64 G, 71/64 DB; 260/555 C

[56] References Cited
UNITED STATES PATENTS

| | | | |
|---|---|---|---|
| 3,379,496 | 4/1968 | Russo | 71/64 DB |
| 3,423,199 | 1/1969 | Philen et al. | 71/1 |
| 3,457,336 | 7/1969 | Harris | 71/64 DB |
| 3,520,651 | 7/1970 | Philen et al. | 71/1 X |
| 3,533,776 | 10/1970 | Coates et al. | 71/28 |
| 3,560,192 | 2/1971 | DeCicco | 71/1 X |
| 3,666,523 | 5/1972 | Nau | 71/64 DB |

*Primary Examiner*—Charles N. Hart
*Assistant Examiner*—Ferris H. Lander
*Attorney, Agent, or Firm*—Oblon, Fisher, Spivak, McClelland & Maier

[57] ABSTRACT

Urea particles uniformly coated with zinc oxide having excellent adherence and uniformity of the zinc oxide coating are obtained by using a zinc oxide composition characterized by having a purity of 90 to 99% zinc oxide and a uniform particle size of at least 90% smaller than 12 microns and at least 95% smaller than 37 microns. Outstanding coatings are obtained if the zinc oxide composition additionally contains traces of carbon, iron oxide, magnesium oxide, or calcium oxide. High zinc-content coatings of excellent uniformity and adherence may be obtained with these coating compositions.

9 Claims, 6 Drawing Figures

ZINC OXIDE COATED UREA

BACKGROUND OF THE INVENTION

1. Field Of The Invention:

This invention relates to urea-zinc oxide fertilizers and methods of preparing them. More particularly, this invention relates to the urea particles coated with a particular zinc oxide composition, which exhibit excellent uniformity and adherence of the zinc oxide coating, even with relatively high amounts thereof.

2. Description Of The Prior Art:

Urea is widely used in many fertilizer applications as a source of nitrogen. In many instances it is the preferred nitrogen source, since it contains a higher percentage of nitrogen as compared with many other available nitrogen-containing materials. Furthermore, urea may be made into a variety of particulate forms, such as granules, crystals, or prills, which are convenient to handle.

Zinc has been used with a variety of fertilizer compositions, since it is one of the micronutrients identified as essential to all living things, and therefore a very desirable trace element. However, in many applications, such as the correction of soil zinc deficiencies and the growth of particular crops, such as rice, corn, or the like, zinc is often used in relatively large amounts on the order of 6 to 8%. Heretofore, however, no suitable method has been devised for incorporating such relatively large amounts of zinc into particulate urea fertilizers. In the past, it had been thought necessary to use water-soluble zinc additives, such as zinc sulphate, zinc nitrate, zinc chloride, zinc carbonate, zinc complexes, and chelates such as zinc-EDTA chelate. However, water-soluble zinc salts are highly hygroscopic, and therefore generally unsuitable for use in particulate fertilizer compositions when present in greater than trace amounts.

The percentage of elemental zinc present in various zinc sources varies according to the chemical composition and purity of the zinc source being used. For example, zinc oxide sources usually vary from 70 to 78% zinc, as compared to only 26 to 36% zinc in zinc sulphate, and 5 to 14.5% zinc in chelates of zinc. Thus, for use in fertilizer compositions containing large amounts of zinc, zinc oxide would be preferred due to its high content of elemental zinc.

It is highly desirable to apply zinc in a single step together with other fertilizing compounds, due to the labor savings achieved. Prior art methods for adding zinc salts to fertilizer compositions for such one-step application have included dry blending, coating, and solution dispersion methods. Two major disadvantages detract from all of these methods, viz. hygroscopicity and the difficulty of obtaining a uniform product.

Dry blending of zinc salts with particulate fertilizer compositions is generally unsatisfactory, since combinations of zinc salts and urea are usually hygroscopic and thus absorb moisture from the air and agglomerate into an unusable solid cake. Furthermore, powdery zinc compounds readily separate from the particulate material resulting in a waste of zinc, often interfering with the proper operation of fertilizer dispensing machinery and causing nonuniform application to crops.

While the use of zinc compounds in a liquid dispersion is at present probably the most widely used technique for applying zinc fertilizer compositions, the water-insolubility of zinc oxide poses serious drawbacks. The handling of such dispersions is complicated by their heterogenity, which requires mixing prior to any fluid transfer during handling or application to assure a uniform suspension.

In one attempt to overcome the disadvantages faced by the prior art, several methods of coating zinc compounds on particulate fertilizer compositions have been described. However, the inherent highly hygroscopic properties of the zinc salts still cause problems, since particulate fertilizer compositions coated with these zinc salts tend to absorb moisture from the air and agglomerate into an unusable solid cake. Attempts to slow the rate of water absorption by the use of a clay binder or other exterior coating have not been sufficient to counteract the increased rate of water absorption. Furthermore, it is extremely difficult to obtain uniform coating of zinc salts on urea. The presence of an uneven coating results in exposed areas which provide sites for the urea particles to cake or stick together, and the zinc compounds tend to powder off from the urea particles, forming a zinc powder separate from the particulate material to be applied. Thus, the disadvantages of the dry blending technique are not overcome in a wholly satisfactory manner.

In one particular attempt to overcome the drawbacks of coating fertilizers with zinc and related compounds, Philen, Jr., et al U.S. Pat. No. 3,423,199 describe a process wherein granules of hygroscopic fertilizer salts are coated with micronutrient powders which, when wetted with water and/or steam, react with the fertilizer constituents to form in situ stable complexes. Fertilizer granules, which may include urea, are first dried to a relatively low level of moisture content, and then mixed vigorously for at least 3 minutes with a micronutrient compound ground to a fine particle size, preferably 95% or more passing through a standard 325 mesh screen, which corresponds to a particle size of 44 microns or less. The micronutrient is incorporated intimately into the structure of the granule surface, rather than in a shell surrounding the granule. Several problems remain using this process; for example, the adherence when using zinc oxide is stated to be less satisfactory in continuous tests than in batch tests. Furthermore, complete coverage of the binding agent on the fertilizer could not be obtained in a continuous mixer, although such coverage was attainable in batch tests. When combining an insoluble micronutrient source with macronutrient material, a certain ratio of micronutrient could not be exceeded in order to obtain adequate solubility in the solution resulting from the dissolution of the macronutrient material. In addition, it would be desirable if such coatings could be applied without the necessity of subsequent treatment with water, since these particulate fertilizers must be kept dry to be free-flowing, and since they have hygroscopic properties, which tend to absorb and hold the water applied in any subsequent treatment.

Those concerned with the development of solid, particulate, zinc-containing fertilizer compositions have long desired a particulate urea-zinc fertilizer which could be handled in the same manner as particulate urea fertilizers. Furthermore, it would be highly desirable if such particulate fertilizers could be prepared by a relatively simple process which did not significantly increase the hygroscopicity of the resultant product. The present invention fills such needs.

SUMMARY OF THE INVENTION

Accordingly, one object of the present invention is to provide a particulate urea-zinc fertilizer.

Another object of the present invention is to provide a simple process for preparing particulate urea fertilizer compositions uniformly coated with adherent zinc oxide.

A further object of the present invention is to provide a particulate urea-zinc fertilizer wherein the zinc is homogenously coated on the urea particles.

Yet another object of the present invention is to provide stable urea-zinc fertilizers having a high elemental zinc content.

An additional object of the present invention is to provide urea-zinc fertilizer particles which may be handled in the same manner as conventional urea particles.

Briefly, these and other objects are attained in one aspect of the present invention which provides a particulate fertilizer composition comprising urea particles uniformly coated with a zinc oxide composition characterized by having a purity of 90 to 99% zinc oxide and a uniform particle size of at least 90% less than 12 microns and at least 95% less than 37 microns. Preferred zinc oxide compositions are further characterized by having a carbon content of from 0.05 to 2.0% and a bulk density of 20 to 50 lbs. per cubic foot. The zinc oxide composition may contain, in addition to or in place of carbon, trace amounts of material such as iron oxide, magnesium oxide, and calcium oxide. Preferably, the zinc oxide composition used in coating urea particles in accordance with the present invention will be characterized by having a purity of 95 to 99% zinc oxide and a uniform particle size of at least 90% less than 8 microns, and at least 98% less than 37 microns. Especially preferred compositions are further characterized by having a carbon content from 0.2 to 0.5% and a bulk density of 28 to 38 lbs. per cubic foot. While coatings of from 1 to 25% by weight on urea particles are suitable, preferred coatings will contain from 1 to 10% by weight of the zinc oxide composition. Compositions containing minor amounts, either alone or in admixture, of iron oxide, magnesium oxide, and calcium oxide, while somewhat less desirable than those having minor amounts of carbon, are also preferred. When these additional compounds are present, there may be from 0.2 to 5.0% iron oxide; from 0.1 to 2.0% magnesium oxide; and from 0.1 to 2.0% calcium oxide. Especially preferred concentrations of these elements are 2.4 to 4.0% iron oxide; 0.5 to 1.0% magnesium oxide; and 0.5 to 1.0% calcium oxide.

BRIEF DESCRIPTION OF THE DRAWINGS

These and other objects, feature, and advantages of the present invention will become more fully apparent to those skilled in the art by reference to the following description and examples of illustrative preferred embodiments of the invention together with the annexed Drawings, in which.

Figure 1:
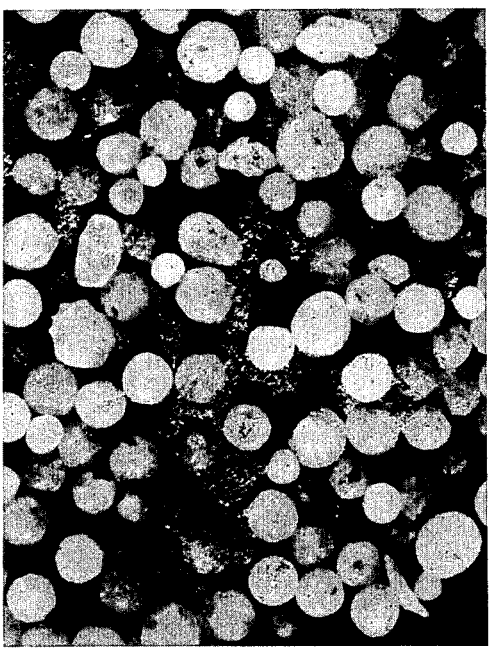
FIG. 1 is a photomicrograph of urea prills coated with a zinc oxide composition containing 90% zinc oxide and having a particle size of −325, +400 mesh.

Zinc oxide coatings in accordance with the present invention may be prepared by any conventional methods, such as dry blending or the like. Although the quality of the zinc oxide coating will be quite high so long as the purity and particle size limitations are met, the uniformity of the coating can be further improved by the presence of certain trace amounts of carbon, iron oxide, magnesium oxide or calcium oxide. That these materials produce better uniformity is quite surprising, in view of the observed fact that trace amounts of silicon oxide, aluminum oxide, and copper oxide do not have a similar effect. Best results have been obtained when the trace material is carbon, preferably in amount of from 0.05 to 2.0%. While not wishing to be bound by any theory of operation of the invention, it appears that the presence of these minute amounts of carbon improves coating uniformity by preventing the zinc oxide from agglomerating or bridging. This has been confirmed by calcining zinc oxide-carbon compositions so as to eliminate the traces of carbon, where upon it was observed that the coating ability of the zinc oxide was substantially impared. If carbon was then re-added to the calcined zinc oxide compositions, the uniformity of the coatings was again improved.

The above and other objects, features, and advantages will become more fully apparent to those skilled in the art from the following description and examples of preferred embodiments of the invention, which are presented by way of example and not by way of limitation.

DESCRIPTION OF PREFERRED EMBODIMENTS

In accordance with the present invention, urea particles are coated by conventional means with zinc oxide compositions characterized by having a purity of at least 90 to 99% zinc oxide and a uniform particle size of at least 90% less than 12 microns, and at least 95% less than 37 microns. The particle size range of less than 37 microns corresponds to particles passing through a 400 mesh screen. That such improved results are obtained in accordance with the present invention is particularly surprising in view of the fact that the prior art has used compositions as small as 44 microns in diameter (−325 mesh) without attaining the results achievable in accordance with the present invention. Especially preferred compositions used in accordance with the present invention preferably have a bulk density of 20 to 50 lbs. per cubic foot. The bulk density may effect the coating characteristics of the material, due to differences in surface area, porosity, and flow properties. Trace amounts of material such as carbon, iron oxide, magnesium oxide, and calcium oxide, either alone or in admixture, are desirable for further improving the uniformity of the coating. Best results are obtained when the zinc oxide composition used in coating urea particles is characterized by a purity of 95 to 99% zinc oxide and a uniform particle size of at least 90% less than 8 microns, and at least 98% less than 37 microns, and most especially also having a carbon content of from 0.2 to 0.5% and a bulk density of 28 to 38 lbs. per cubic foot.

It is important that each characteristic of the zinc oxide composition falls within the above-mentioned purity and particle size ranges in order to provide satifactory coatings. Thus, the use of zinc oxide of a purity lower than 90% will result in inferior coatings and considerable powdering off of the zinc oxide from the urea particles. For example, a zinc oxide source containing less than 72% elemental zinc (90% zinc oxide) has been shown to be unsatisfactory for coating urea particles, and can only be used with the additional presence of a binder material, such as ammonium nitrate, clay, or the like. In contrast, good, uniform coatings may be obtained by using the zinc oxide composition of this invention without such additional binder materials, although they may be added if desired for specialty purposes.

The zinc oxide used must also have the particular particle size of at least 90% less than 12 microns and at least 95% less than 37 microns. Particles smaller than 37 microns (—400 mesh) coat significantly better than particles in the 37 to 44 micron size range (—325, +400 mesh).

Figure 2:
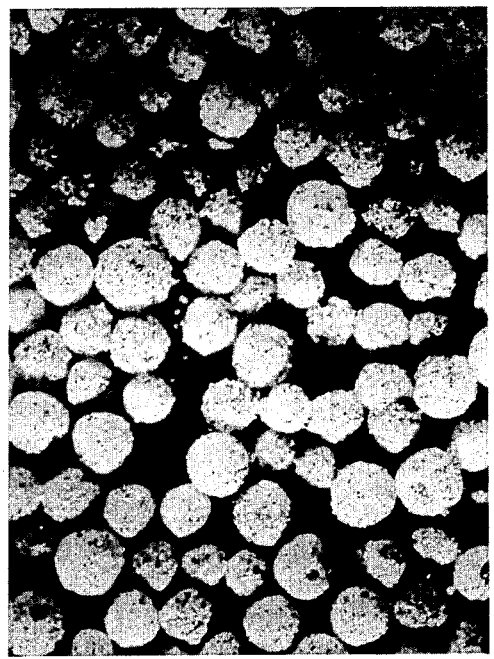
FIG. 2 is a similar photomicrograph of a coating obtained with a zinc oxide composition containing 90% zinc oxide and −400 mesh particles.
Figure 3:
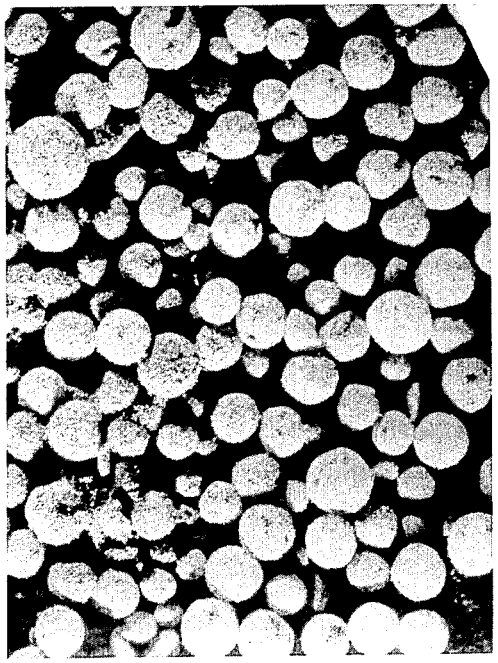
FIG. 3 is a similar photomicrograph of a coating obtained with a zinc oxide composition containing 95% zinc oxide and having a particle size of −325, +400 mesh.
Figure 4:
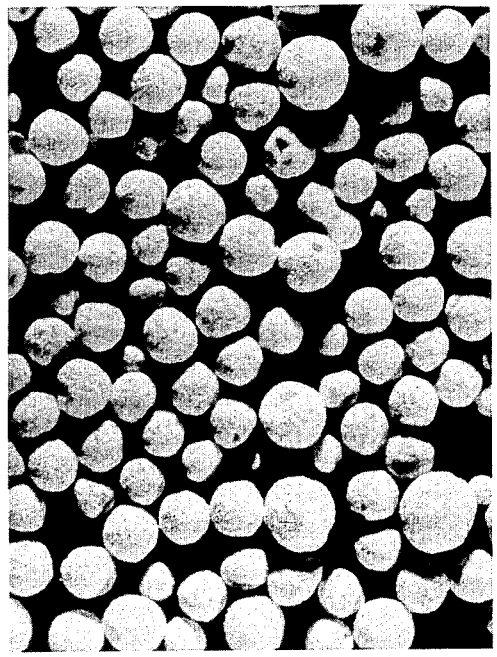
FIG. 4 is a similar photomicrograph of a coating obtained with a zinc oxide composition containing 95% zinc oxide and −400 mesh particles, with trace amounts of carbon and metal oxides.
Figure 5:
FIG. 5 is a similar photomicrograph of a coating obtained with a chemically pure zinc oxide composition wherein 100% of the particles were of −400 mesh.
Figure 6:
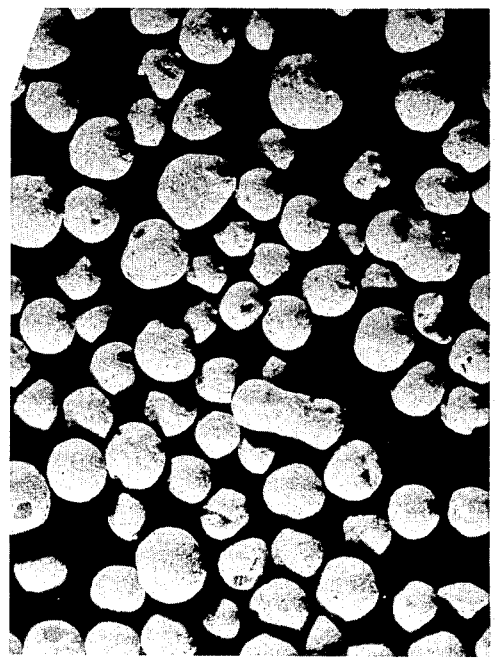
FIG. 6 is a similar photomicrograph of a coating obtained with the same C.P. zinc oxide, to which 0.5% carbon had been added.

Referring briefly to the drawings, the differences in coating on urea prills obtained from zinc oxide compositions varying in particle size and purity, or both, from the ranges in accordance with this invention are striking. FIG. 1 shows that coatings obtained from zinc oxide compositions outside of both of these ranges are extremely poor, exhibiting little adherence and no uniformity. FIGS. 2 and 3 show some improvements obtained when using zinc oxide compositions possessing only the particle size or purity, respectively, of compositions used in accordance with the present invention. Referring to FIG. 4, extremely uniform coatings of zinc oxide showing exceptional adherence are obtainable in accordance with the present invention. FIG. 4 illustrates coatings obtained using a zinc oxide source having the purity and particle size of this invention, and also containing trace amounts of carbon, iron oxide, magnesium oxide, and calcium oxide. The coatings shown in FIG. 5 illustrate the exceptional results which can be obtained using high purity zinc oxide compositions wherein 100% of the particles were of —400 mesh (i.e., less than 37 microns in diameter). FIG. 6 shows that coatings can be even further improved, when the same zinc oxide composition as used in the coatings shown in FIG. 5 had 0.5% carbon added thereto.

As is apparent from the examination of the drawings, when the particle size of the zinc oxide composition used for coating urea falls outside of the ranges in accordance with this invention, the adherence of the zinc oxide particles is adversely affected. Even if a satisfactory coating can be initially obtained, it will powder off during routine handling, and accordingly is very undesirable.

While particle size is an important factor in coating, it is not the only critical parameter which must be observed. Purity of the zinc oxide composition has a significant effect on the adherence of the coatings. A satisfactory zinc oxide coated urea suitable for fertilizer use must have a coating which is both uniform and adherent, since uniformity of the coating helps to prevent caking and serves as a moisture barrier. Referring again to the figures, it can be seen in FIGS. 4 thru 6, that highly uniform coatings are obtained when both particle size and purity limitations are observed. Coating uniformity is further improved by the addition of trace elements such as carbon, iron oxide, magnesium oxide and calcium oxide.

While bulk densities do not differ substantially among higher grade zinc oxide compositions, they may be significantly higher with low grade compositions. The bulk density may effect the coating characteristics of the material, due to differences in surface area, porosity, and flow properties of the composition.

Highly satisfactory zinc oxide-coated urea particles are obtained when using the zinc oxide compositions of this invention. By observing particle size limitations of the present invention, good adherence of zinc oxide coatings to particulate urea is obtained. By observing the purity limitations of the present invention, good uniformity of the zinc oxide coatings is achieved. Coating uniformity is outstanding when certain trace elements are present in the zinc oxide composition, thus permitting the coated particles to be subjected to ordinary handling procedures without losing the zinc oxide composition. Coatings obtained using these compositions are characterized in good adherence, uniformity, a high zinc content in the coated particle, low caking tendency and an effective moisture barrier provided by the coating.

Having now generally described the invention, the following examples are presented by way of illustration in order to obtain a better appreciation thereof. Unless otherwise indicated, these examples are for illustration only are not intended to be limiting in any way. In the following examples, the chemical analysis of zinc oxide samples were run by standard wet chemical tests. Particle size distribution was obtained from wet screen analysis and by the soil dispersion (hydrometer) method, ASTM D 422-63. Bulk densities were determined by converting the weight of 100 cubic centimeters in grams to pounds per cubic foot. Adherences were determined by exposing coated samples to a vigorous air flow for 5 minutes, and measuring the amount of original coating retained. Adherence values above 95% are considered excellent. In all cases, the coated samples were visually observed at 20x magnification for coating uniformity. In calcining, zinc oxide samples were heated at 1600°F, ground to less than 400 mesh (i.e., less than 37 microns), and used to coat urea prills with 8% of the calcined materials.

EXAMPLE 1

Chemical analysis were run on four different zinc oxide samples in order to determine the effect of elements present therein on coating abilities. The data obtained is presented in Table 1. Physical properties of the zinc oxide samples were also determined and are presented below in Table 2.

TABLE 1

| | CHEMICAL ANALYSIS OF ZINC OXIDES | | | |
|---|---|---|---|---|
| | Sample A | Sample B | Sample C | Sample D |
| % ZnO | 95.0* | 98.5* | 90.0* | 96.5* |

TABLE 1-continued

CHEMICAL ANALYSIS OF ZINC OXIDES

| | Sample A | Sample B | Sample C | Sample D |
|---|---|---|---|---|
| % Zn | 76.0* | 79.0* | 72.0* | 77.0* |
| % $SiO_2$ | 0.02 | 0.07 | 2.10 | 1.45 |
| % $Fe_2O_3$ | 0.40 | 0.20 | 2.99 | 0.85 |
| % $Al_2O_3$ | 1.38 | 0.30 | 2.04 | 0.42 |
| % CaO | 1.64 | 0.33 | 0.42 | 0.25 |
| % MgO | 0.68 | 0.54 | 0.35 | 0.18 |
| % Cl | 0.10 | 0.07 | 0.94 | 0.35 |
| % Pb | — | — | 0.75* | — |
| % Carbon | Trace* | — | — | — |
| pH (10% Mixture) | 7.21 | 7.60 | 7.46 | 7.80 |
| % Ignition Loss (1 hr. at 1600°F) | 3.80 | 0.34 | 3.97 | 0.20 |
| % Moisture by Oven Drying (2 hrs. at 200°F) | 0.70 | 0.05 | 0.10 | 0.04 |

*Manufacturer'Assay

TABLE 2

PHYSICAL PROPERTIES OF ZINC OXIDES

| Particle Size: | c.p. ZnO | Sample A | Sample B | Sample C | Sample D |
|---|---|---|---|---|---|
| % + 37 $\mu$ | 0 | 0.03 | 0 | 1.1 | 0 |
| % 12 – 37 $\mu$ | 5.5 | 8.6 | 0 | 43.8 | 0 |
| % 8 – 12 $\mu$ | 0 | 0 | 6.4 | 11.5 | 33.0 |
| % 5 – 8 $\mu$ | 0 | 0.6 | 3.2 | 12.8 | 19.3 |
| % 0 – 5 $\mu$ | 94.5 | 90.5 | 90.4 | 30.8 | 47.7 |
| Loose Bulk Density, No./ft.$^3$ | 31.2 | 38.4 | 28.4 | 88.5 | 44.9 |
| Typical % Adherence at 8% Coating | 99.8 | 99 | 99.7 | 24.3 | 99.0 |

EXAMPLE 2

In order to determine the effects of particle size distribution on coating, 42-0-0-6 (Zn) prills were produced by coating urea prills with samples A and C of different particle size distributions. Sample A, in a −325, +400 mesh particle range, gave very coarse, non-uniform coating with some of the zinc oxide material separated from the prills. In contrast, −400 mesh particles of sample A gave a very uniform coating, having very few bare spots. Sample C, in a −325, +400 mesh particle size range was totally unsatisfactory and gave almost no visible coating, with large aggregations of zinc oxide clumped together. However, sample C particles of −400 mesh gave coatings with fairly good uniformity, having a few bare spots but very little zinc oxide that had not coated the urea prills.

EXAMPLE 3

In an effort to determine the effect of various impurities present in the zinc oxide composition on the coating effectiveness, several samples were tested with and without various additives. The results are shown in Table 3.

TABLE 3

EFFECT OF IMPURITIES IN ZINC OXIDES ON COATING

| Coating | % Adherence | Coating Uniformity * |
|---|---|---|
| 8% c.p. ZnO | 99.8 | 3 |
| 8% c.p. ZnO w/2.5% $SiO_2 \cdot H_2O$ | 99.6 | 4 |
| 8% c.p. ZnO w/3% $Fe_2O_3$ | 99.8 | 1 |
| 8% c.p. ZnO w/2% $Al(OH)_3$ | 99.2 | 4 |
| 8% c.p. ZnO w/2% $Al_2O_3$ | 99.2 | 4 |
| 8% c.p. ZnO w/1% CaO | 99.8 | 2 |
| 8% c.p. ZnO w/1% MgO | 99.9 | 2 |
| 8% c.p. ZnO w/0.5% CuO | 99.8 | 4 |
| 8% c.p. ZnO w/4% $Fe_2O_3$ &0.4% MgO | 99.8 | 1 |
| 8% c.p. ZnO w/0.05% Carbon [C] | 99.9 | 1 |
| 8% c.p. ZnO w/0.2% C | 99.9 | 1 |
| 8% c.p. ZnO w/0.5% C | 99.9 | 1 |

TABLE 3-continued

EFFECT OF IMPURITIES IN ZINC OXIDES ON COATING

| Coating | % Adherence | Coating Uniformity * |
|---|---|---|
| Sample D w/0.2% C | 99.7 | 3 |
| Sample B w/0.2% C | 99.7 | 3 |
| Sample D w/0.5% C | 99.5 | 3 |
| Sample B w/0.5% C | 99.6 | 3 |
| Sample B w/1% $Fe_2O_3$ | 99.5 | 3 |
| Sample B w/1% $Fe_2O_3$ & 0.5% MgO | 99.4 | 3 |
| Sample B w/2% $Fe_2O_3$ | 99.7 | 2 |

* Legend for Coating Uniformity:
1. Excellent uniformity of coating; practically no bare spots.
2. Very good uniformity; very few bare spots.
3. Good uniformity; a few bare spots.
4. No improvement in coating uniformity.

EXAMPLE 4

In order to determine the effects of calcining zinc oxide prior to coating, experiments were run on the same five samples (chemically pure, and samples A thru D) both before and after calcining. The results obtained are presented in Table 4.

TABLE 4

EFFECT OF CALCINING ZINC OXIDE ON COATING

| | % Adherence | | |
|---|---|---|---|
| Coating | Before Calcining | After Calcining* | Coating Uniformity After Calcining** |
| 8% c.p. ZnO | 99.8 | 87.8 | 3 |
| Sample A | 95.7 | 97.0 | 3(2 after adding 0.2% carbon) |
| Sample B | 99.7 | 99.7 | 2 |
| Sample C | 24.3 | 20.6 | 2 |
| Sample D | 99.0 | 98.3 | 2 |

*After calcining the ZnO samples, they were ground with mortar and pestle to −400 mesh. Zinc oxide crystals may increase in particle size as much as 12 times on

TABLE 4-continued
EFFECT OF CALCINING ZINC OXIDE ON COATING

| Coating | % Adherence Before Calcining | After Calcining* | Coating Uniformity After Calcining** |
|---------|------------------------------|------------------|--------------------------------------|

*heating one hour at 1832°F. (Brown, Harvey E. Zinc Oxide Rediscovered, The New Jersey Zinc Company, New York, p. 35, 1957).
**Legend for Coating Uniformity:
1. Better than original coating.
2. Same as original coating.
3. Worse than original coating.

In brief summary, the use of zinc oxide compositions in accordance with the present invention has been found extremely useful for obtaining highly uniform coatings of zinc oxide on particulate urea. A wide variety of zinc content preparations may be made by this process, and other ingredients such as trace elements and the like, may be added if desired. Accordingly, it will be appreciated that while the foregoing disclosure relates only to preferred embodiments of the invention for preparing urea particles having a fertilizing quantity of available zinc in the form of zinc oxide uniformly and adherently coated thereover, numerous modifications and alterations may be made by those skilled in the art without departing from the spirit and scope of the invention as set forth in the appended claims. ACCORDINGLY,

What is claimed as new and intended to be secured by Letters Patent of the United States is:

1. A fertilizer composition comprising urea particles uniformly coated with a fertilizing amount of an adherent zinc oxide composition, said zinc oxide composition characterized by having a purity of 95 to 99% zinc oxide, and a uniform particle size, with at least 90% of the zinc oxide particles less than 8 microns in diameter and at least 98% of said particles less than 37 microns in diameter.

2. The fertilizer composition of claim 1, wherein said zinc oxide composition is further characterized by having a bulk density of from 20 to 50 lbs. per cubic foot.

3. The fertilizer composition of claim 1, wherein said zinc oxide contains from 0.2 to 0.5% carbon; from 0.2 to 5% iron oxides; from 0.1 to 2% magnesium oxide; from 0.1 to 2% calcium oxide; or mixtures thereof.

4. The fertilizer composition of claim 1, wherein said zinc oxide composition contains from 0.05 to 2.0% carbon.

5. The fertilizer composition of claim 1, wherein said zinc oxide coating is present in an amount of from 1 to 25% by weight.

6. The fertilizer composition of claim 1, wherein said zinc oxide composition is further characterized by having a bulk density of from 28 to 38 lbs. per cubic foot.

7. The fertilizer composition of claim 1, wherein said zinc oxide composition further comprises from 0.2 to 0.5% carbon; from 2.4 to 4.0% iron oxide; from 0.5 to 1% magnesium oxide; from 0.5 to 1% calcium oxide; or mixtures thereof.

8. The fertilizer composition of claim 1, wherein said zinc oxide composition is characterized by having a carbon content of from 0.2 to 0.5%.

9. The fertilizer composition of claim 1, wherein said zinc oxide coating is present in an amount of from 1 to 25% by weight.

* * * * *

UNITED STATES PATENT AND TRADEMARK OFFICE
CERTIFICATE OF CORRECTION

PATENT NO. : 3,941,578
DATED : March 2, 1976
INVENTOR(S) : GERALD L. TUCKER and ELMER LADELLE BLANTON It is certified that error appears in the above–identified patent and that said Letters Patent are hereby corrected as shown below:

Page 1, under "[75] Inventors", the inventors' address should read --both of Yazoo City, Miss.---.

Signed and Sealed this twenty-second Day of June 1976

[SEAL]

Attest:

RUTH C. MASON
*Attesting Officer*

C. MARSHALL DANN
*Commissioner of Patents and Trademarks*